United States Patent
Krounbi et al.

(10) Patent No.: US 6,693,760 B1
(45) Date of Patent: Feb. 17, 2004

(54) PREAMPLIFIER CIRCUIT CONFIGURABLE TO ALLOW SIMULTANEOUS READ AND WRITE OPERATIONS FOR SELF-SERVO WRITING A DISK DRIVE

(75) Inventors: Mohamad T. Krounbi, San Jose, CA (US); John Cuda, Saratoga, CA (US); Jack M. Chue, Los Altos, CA (US); Robert Leslie Cloke, Santa Clara, CA (US); David Price Turner, Los Gatos, CA (US); Gary L. Dunbar, Gilroy, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 09/540,445

(22) Filed: Mar. 31, 2000

(51) Int. Cl.$^7$ ................................................ G11B 21/02
(52) U.S. Cl. .............................. 360/75; 360/51; 360/67
(58) Field of Search ................................ 360/75, 67, 51

(56) References Cited

U.S. PATENT DOCUMENTS

| | | |
|---|---|---|
| 5,229,901 A | 7/1993 | Mallary |
| 5,448,429 A | 9/1995 | Cribbs et al. |
| 5,541,784 A | 7/1996 | Cribbs et al. |
| 5,570,247 A | 10/1996 | Brown et al. |
| 5,668,679 A | 9/1997 | Swearingen et al. |
| 5,757,574 A | 5/1998 | Chainer et al. |
| 5,793,554 A | 8/1998 | Chainer et al. |
| 5,867,337 A | 2/1999 | Shimomura |
| 5,875,064 A | 2/1999 | Chainer et al. |
| 5,907,447 A | 5/1999 | Yarmchuk et al. |
| 5,949,603 A | 9/1999 | Brown et al. |
| 5,991,115 A | 11/1999 | Chainer et al. |
| 6,005,738 A | 12/1999 | Chainer et al. |
| 6,259,576 B1 * | 7/2001 | Ahn .............................. 360/75 |
| 2001/0012170 A1 * | 8/2001 | Yotsuya et al. ............... 360/75 |

OTHER PUBLICATIONS

Regenerative Clock Technique for Servo Track Writers, Oct. 1990, 310–311, IBM Technical Disclosure Bulletin.

* cited by examiner

Primary Examiner—David Hudspeth
Assistant Examiner—Rocio Colon
(74) Attorney, Agent, or Firm—Milad G. Shara, Esq.; Howard H. Sheerin, Esq.

(57) ABSTRACT

A preamplifier circuit is disclosed comprising a data input for receiving write data, a read signal output for outputting an amplified read signal, a read signal input for receiving a read signal from a read element, and a write signal output for supplying a write signal to a write element. The preamplifier circuit further comprises a first amplifier circuit, responsive to the write data, for generating the write signal supplied to the write element, and a second amplifier circuit for amplifying the read signal from the read element to generate the amplified read signal output via the read signal output. A head control circuit, responsive to head select data, simultaneously enables the first and second amplifier circuits to perform a simultaneous read and write operation.

2 Claims, 10 Drawing Sheets

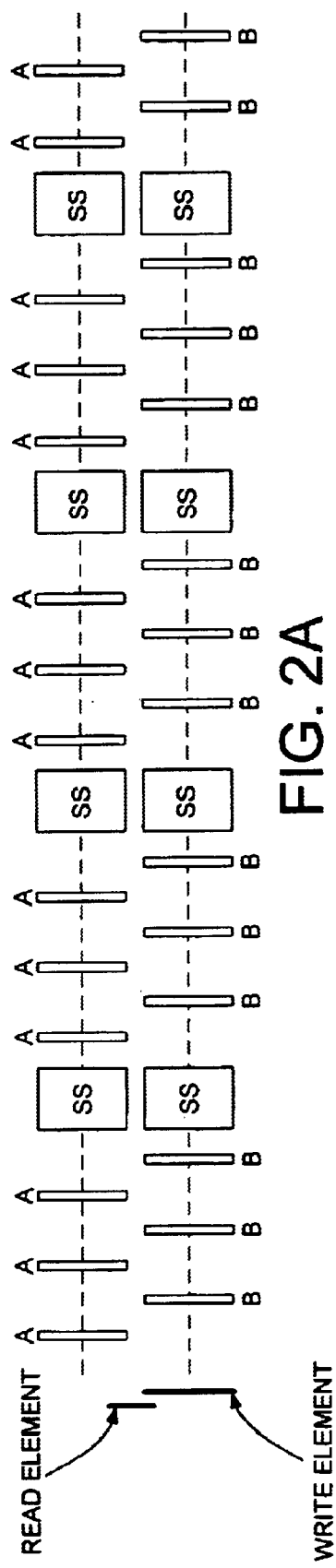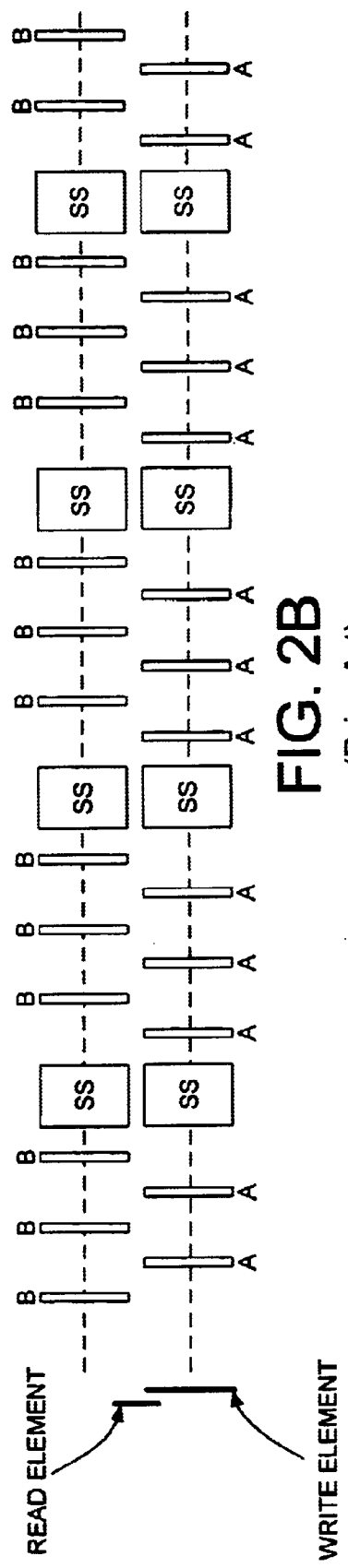
FIG. 2A (Prior Art)
FIG. 2B (Prior Art)

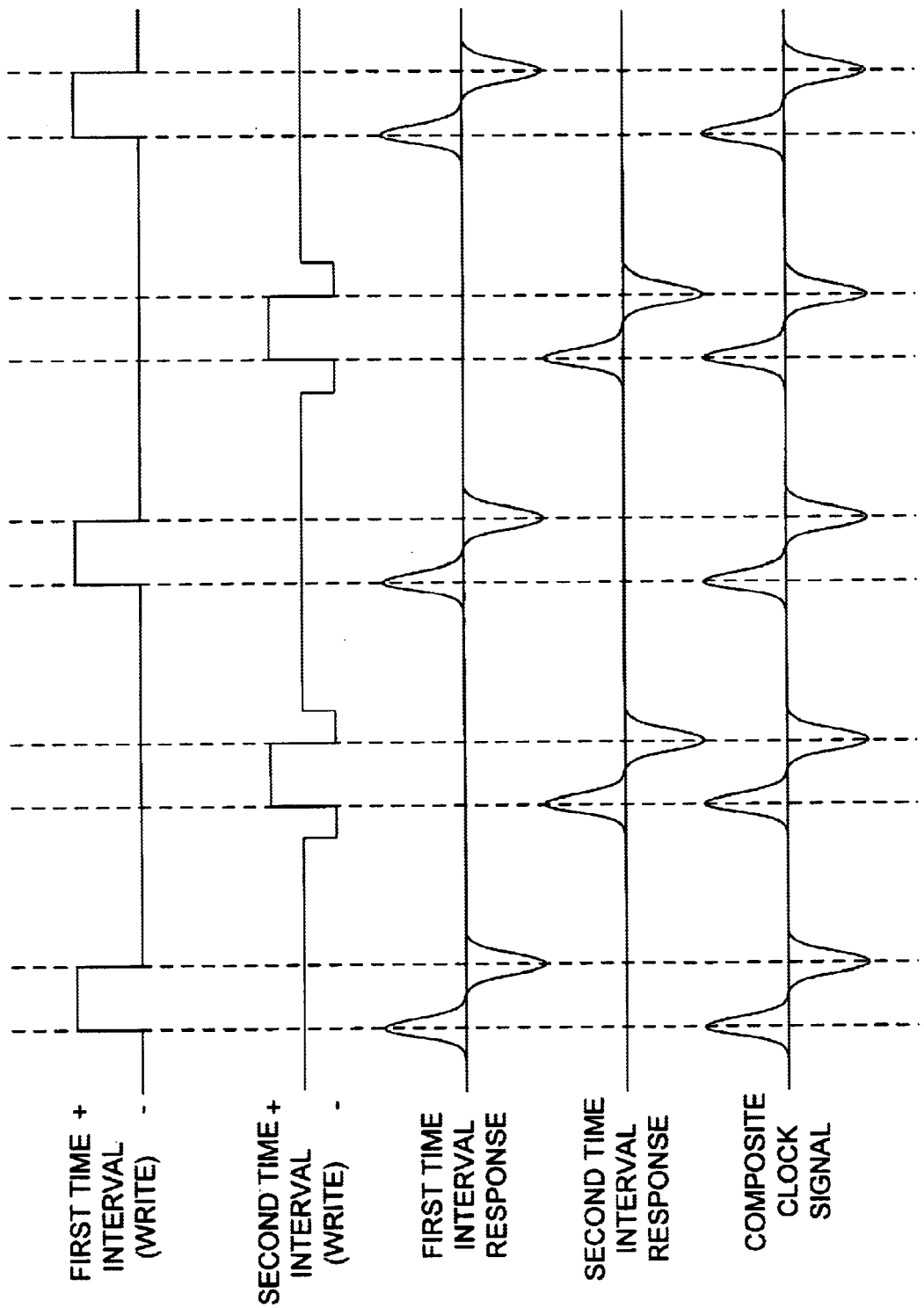

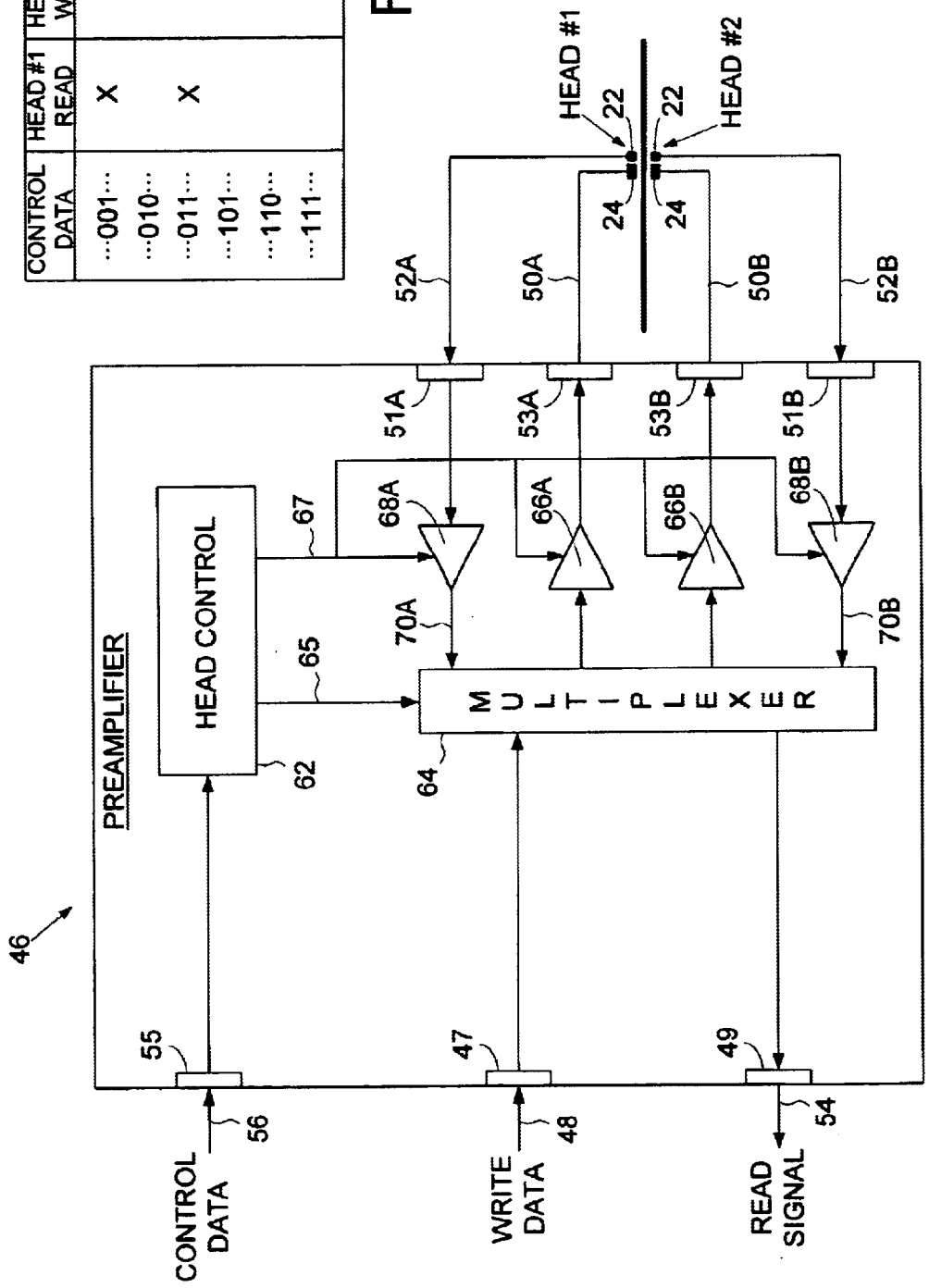

PREAMPLIFIER CIRCUIT CONFIGURABLE TO ALLOW SIMULTANEOUS READ AND WRITE OPERATIONS FOR SELF-SERVO WRITING A DISK DRIVE

BACKGROUND OF THE INVENTION

1. Field of the Invention

The present invention relates to disk drives for computer systems. More particularly, the present invention relates to a preamplifier circuit configurable to allow simultaneous read and write operations for self-servo writing a disk drive.

2. Description of the Prior Art

Disk drives for computer systems comprise a disk for storing data and a head actuated radially over the disk for writing data to and reading data from the disk. To effectuate the radial positioning of the head over the disk, the head is connected to the distal end of an arm which is rotated about a pivot by a rotary actuator (e.g., a voice coil motor (VCM)). The disk is typically divided into a number of concentric, radially spaced tracks, where each track is divided into a number of data sectors. The disk is typically accessed a data sector at a time by positioning the head over the track which comprises the target data sector. As the disk spins, the head writes transitions (e.g., magnetic transitions) in the data sector to record data, and during read operations senses the transitions to recover the recorded data.

Accurate reproduction of the recorded data requires the head to be positioned very close to the centerline of the target data sector during both write and read operations. Thus, accessing a target data sector involves positioning or "seeking" the head to the target track, and then maintaining centerline "tracking" while data is written to or read from the disk. A closed loop servo system typically performs the seeking and tracking operations by controlling the rotary actuator in response to position information generated from the head.

A well known technique for generating the head position control information is to record servo information in servo sectors disbursed circumferentially about the disk, "embedded" with the data sectors. This is illustrated in FIG. 1 which shows a disk 2 comprising a number of concentric tracks 4 and a number of embedded servo sectors 6. Each servo sector 6 comprises a preamble 8, a sync mark 10, servo data 12, and servo bursts 14. The preamble 8 comprises a periodic pattern which allows proper gain adjustment and timing synchronization of the read signal, and the sync mark 10 comprises a special pattern for symbol synchronizing to the servo data 12. The servo data 12 comprises identification information, such as sector identification data and a track address. The servo control system reads the track address during seeks to derive a coarse position for the head with respect to the target track. The track addresses are recorded using a phase coherent Gray code so that the track addresses can be accurately detected when the head is flying between tracks. The servo bursts 14 in the servo sectors 6 comprise groups of consecutive transitions (e.g., A, B, C and D bursts) which are recorded at precise intervals and offsets with respect to the track centerline. Fine head position control information is derived from the servo bursts 14 for use in centerline tracking while writing data to and reading data from the target track.

The embedded servo sectors 6 are written to the disk 2 as part of the manufacturing process. Conventionally, an external servo writer has been employed which writes the embedded servo sectors 6 to the disks by processing each head disk assembly (HDA) in an assembly line fashion. The external servo writers employ very precise head positioning mechanics, such as a laser interferometer, for positioning the head at precise radial locations with respect to previously servo-written tracks so as to achieve very high track densities.

There are certain drawbacks associated with using external servo writers to write the embedded servo sectors 6 during manufacturing. Namely, the HDA is typically exposed to the environment through apertures which allow access to the disk drive's actuator arm and the insertion of a clock head which requires the servo writing procedure to take place in a clean room. Further, the manufacturing throughput is limited by the number of servo writers available, and the cost of each servo writer and clean room becomes very expensive to duplicate.

Attempts to overcome these drawbacks include a "self-servo writing" technique wherein components internal to the disk drive are employed to perform the servo writing function. Self-servo writing does not require a clean room since the embedded servo sectors are written by the disk drive after the HDA has been sealed. Further, self-servo writing can be carried out autonomously within each disk drive, thereby obviating the expensive external servo writer stations.

U.S. Pat. No. 5,949,603 as well as IBM Technical Disclosure Bulletin, Vol. 33, No. 5 (October 1990) disclose in an article entitled "Regenerative Clock Technique for Servo Track Writes" a technique for self-servo writing wherein the servo sectors are written relative to clock data disbursed around the disk and propagated from track to track. The clock data is first written to a "seed" track (e.g., at the inner diameter of the disk) from which the clock data as well as the servo sectors are propagated to the remaining tracks. The head is positioned over the seed track and, while reading the clock data in the seed track, the head is moved away from the seed track until the amplitude of the read signal decreases to some predetermined level. Then the clock data and servo sectors are written to the first track adjacent to the seed track. This process is repeated for the next and subsequent tracks until the embedded servo sectors have been written over the entire surface of the disk. Because the head cannot read and write simultaneously, the clock data is propagated in even and odd interleaves. When servo writing a current track, the even clock data from a previously servo-written track is read to derive timing and head position control information while writing the odd clock data and servo sectors to the current track. When servo writing the next track, the odd clock data from the previously servo-written track is read to derive timing and head position control information while writing the even clock data and servo sectors to the next track, and so on.

This process is illustrated in FIG. 2A and FIG. 2B. FIG. 2A shows a read element being offset from a current track until the amplitude of the read signal decreases to a predetermined level while reading the A (even) clock data. Thereafter a write element begins writing the B (odd) clock data and servo sectors (SS) for the next track. Notice that the head never simultaneously reads and writes because writing to the next track occurs between the A clock data. When finished writing the B clock data and servo sectors to the track, the head is offset from the finished track until the read signal decreases to the predetermined level while reading the just-written B clock data as illustrated in FIG. 2B. The write element then writes the A clock data and the servo sectors to the next track.

When self-servo writing the disk it is important to maintain proper spacing between adjacent tracks as well as proper alignment of the servo sectors from track to track so as to achieve a high recording density (tracks per inch) as well as preserve the phase-coherent nature of the Gray code in the track addresses and proper alignment of the servo bursts. Thus, it is important for the head to maintain the desired radial offset from the previously servo-written track while writing the servo sectors to a current track. In this respect, the above-described prior art self-servo writing technique suffers because the clock data is used both for radial positioning of the head as well as circumferential timing. Various system dynamics induce noise in the read signal while reading the clock data (e.g., errors in writing the clock data, media defects, electronic noise, etc.) which translates into errors when generating the head position control information for use in maintaining the desired radial offset from the previously servo-written track while writing the servo sectors to a current track.

Prior art preamplifier circuits used in magnetic disk recording are configured by a disk control system to select a particular head for a read or write operation, but not both simultaneously. Conventional inductive heads cannot simultaneously read and write since a single inductive element (coil) is used to both read and write. The newer magnetoresistive (MR) heads comprise a separate MR read element and an inductive write element; however, writing data (transitions) to the magnetic disk using the inductive write element interferes with the operation of the MR read element. Therefore, prior art preamplifier circuits have been designed to prevent simultaneous reading while writing. Prior art techniques for self-servo writing a disk drive by propagating a clock pattern, such as disclosed in the aforementioned U.S. Pat. No. 5,949,603, erase the entire surface of the disk before performing the self-servo writing operation. However, this increases the time and expense of self-servo writing the disk drive.

There is, therefore, a need for a more efficient self-servo writing technique which does not require the entire surface of the disk to be erased before performing the self-servo writing operation.

SUMMARY OF THE INVENTION

The present invention may be regarded as a preamplifier circuit comprising a data input for receiving write data, a read signal output for outputting an amplified read signal, a read signal input for receiving a read signal from a read element, and a write signal output for supplying a write signal to a write element. The preamplifier circuit further comprises a first amplifier circuit, responsive to the write data, for generating the write signal supplied to the write element via the write signal output, and a second amplifier circuit for amplifying the read signal from the read element to generate the amplified read signal output via the read signal output. A head control circuit, responsive to head select data, simultaneously enables the first and second amplifier circuits to perform a simultaneous read and write operation.

The present invention may also be regarded as a disk drive comprising a disk having a plurality of tracks, a head comprising a read element and a write element, a control system, and a preamplifier circuit. The preamplifier circuit comprises a data input for receiving write data from the control system, a read signal output for outputting an amplified read signal to the control system, a read signal input for receiving a read signal from the read element, and a write signal output for supplying a write signal to the write element. A first amplifier circuit, responsive to the write data, generates the write signal supplied to the write element via the write signal output, and a second amplifier circuit amplifies the read signal from the read element to generate the amplified read signal output to the control system via the read signal output. A head control circuit, responsive to head select data received from the control system, simultaneously enables the first and second amplifier circuits to perform a simultaneous read and write operation.

BRIEF DESCRIPTION OF THE DRAWINGS

FIGS. 2A and 2B show a prior art technique of self-servo writing a disk wherein centerline tracking is implemented using head position control information derived from reading an even or odd interleave of clock data.

FIG. 7 shows the state of the write current when writing the interleaved clock data to a current track as well as the resulting response when reading the interleaved clock data.

FIG. 8A and FIG. 8B illustrate a preamplifier circuit configurable to allow a simultaneous read and write operation which facilitates writing the interleaved clock data and servo bursts to a current track while reading the interleaved clock data and servo bursts from a previously servo-written track.

DESCRIPTION OF THE PREFERRED EMBODIMENTS

Figure 1:
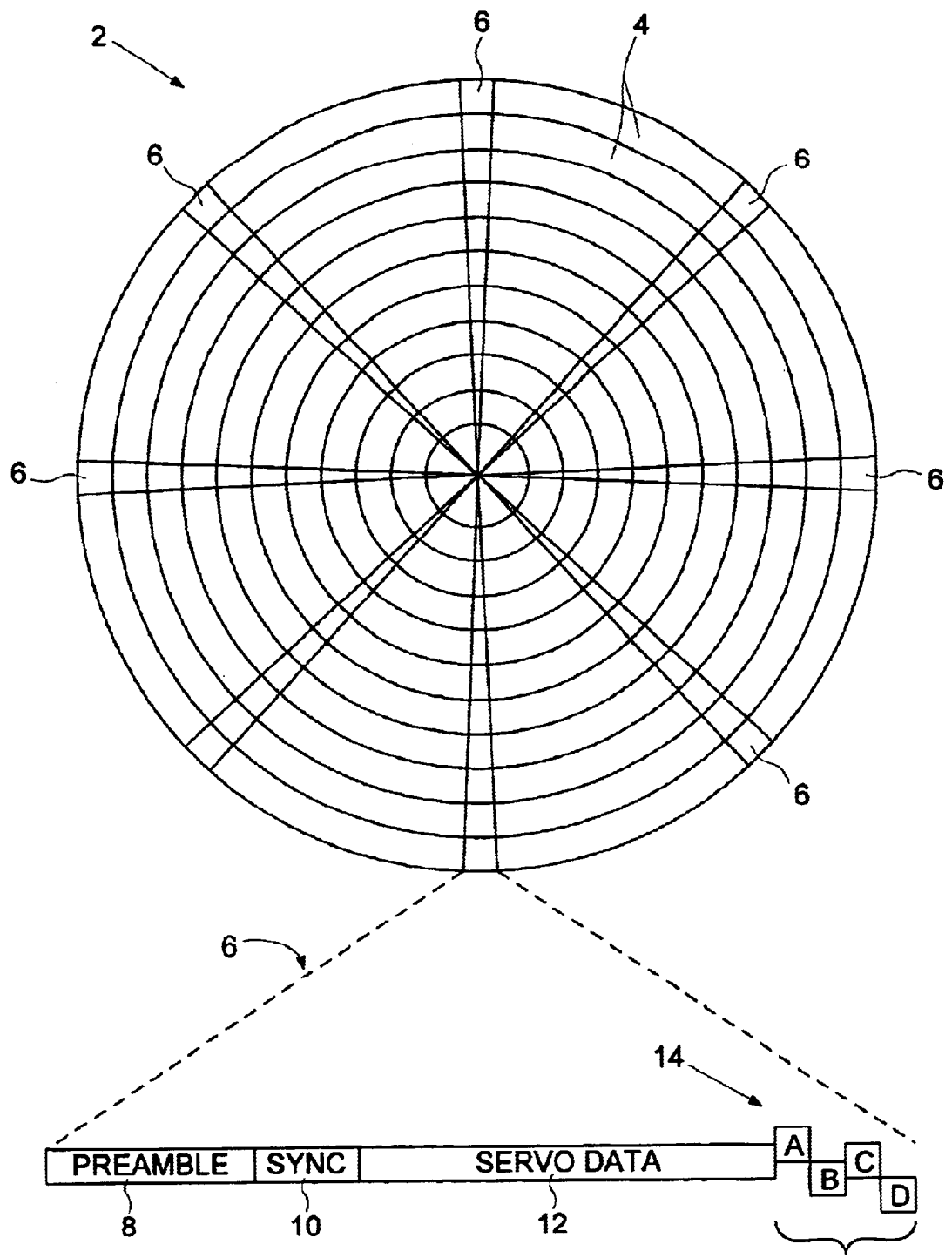
FIG. 1 shows a disk comprising a plurality of concentric, radially spaced tracks for storing user data in a plurality of user data sectors and servo data in a plurality of embedded servo sectors, wherein the servo data comprises a plurality of servo bursts.

FIG. 8A shows a preamplifier circuit 46 according to an embodiment of the present invention. The preamplifier circuit 46 comprises a data input 47 for receiving write data 48, a read signal output 49 for outputting an amplified read signal 54, a read signal input 51 for receiving a read signal 52 from a read element 22, and a write signal output 53 for supplying a write signal 50 to a write element 24. A first amplifier circuit 66, responsive to the write data 48, generates the write signal 50 supplied to the write element 24, and a second amplifier circuit 68 amplifies the read signal 52 from the read element 22 to generate the amplified read signal 54 output via the read signal output 49. A head control circuit 62, responsive to head select data 56, simultaneously enables the first and second amplifier circuits 66 and 68 to perform a simultaneous-read and write operation.

Figure 3:
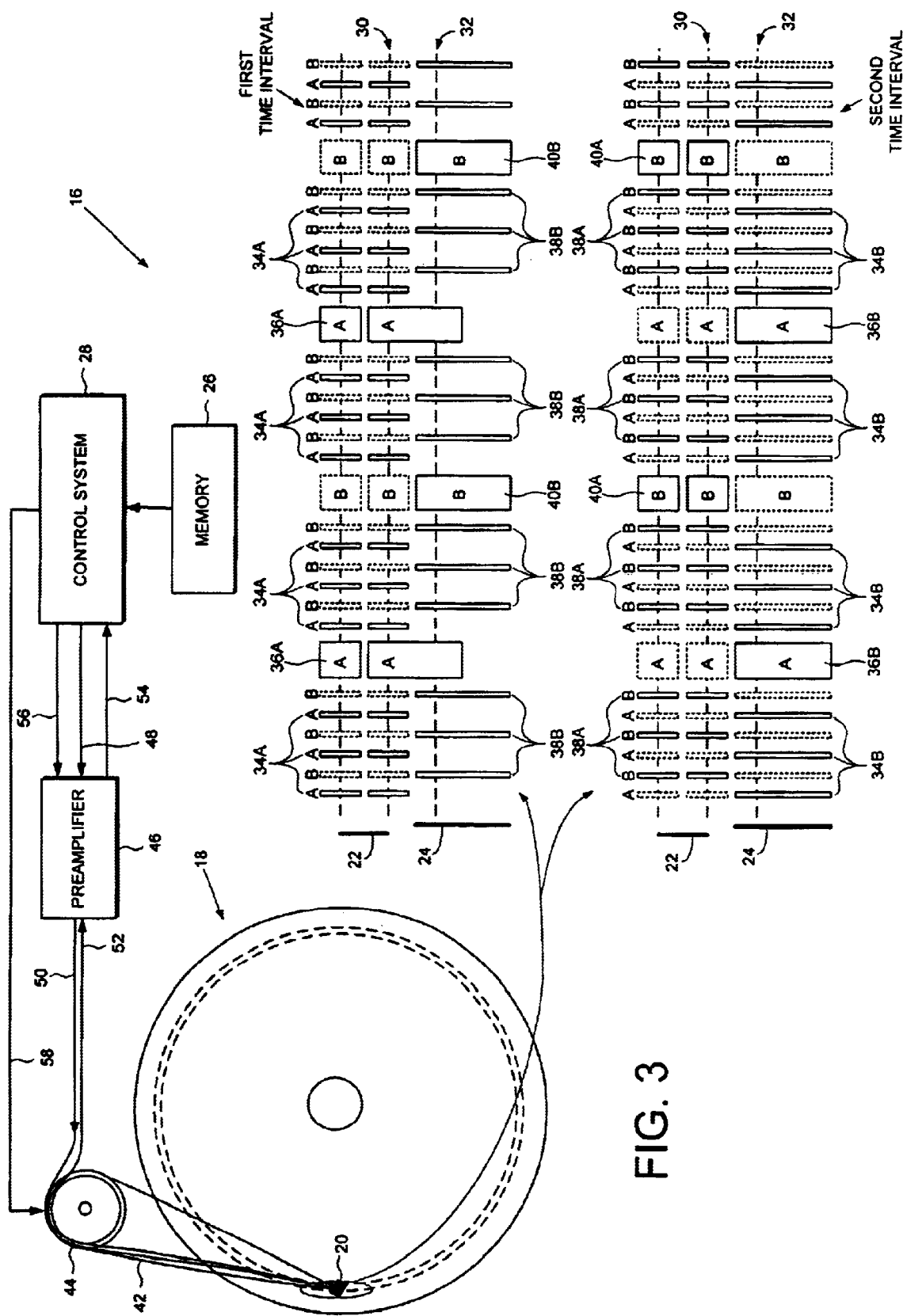
FIG. 3 shows a self-servo writing disk drive according to an embodiment of the present invention comprising a disk, a head actuated over the disk, a preamplifier circuit, a memory for executing the steps of a self-servo writing program, and a control system for executing the steps of the self-servo writing program.

FIG. 3 shows a disk drive 16 according to an embodiment of the present invention. The disk drive 16 comprises a disk 18 having a first radial location 30 and a second radial location 32, the first radial location for storing first A clock data 34A interleaved with first B clock data 38A and first A servo bursts 36A interleaved with first B servo bursts 40A, the second radial location 32 for storing second A clock data 34B interleaved with second B clock data 38B and second A servo bursts 36B interleaved with second B servo bursts 40B. The disk drive 16 comprises a head 20 comprising a read element 22 and a write element 24, wherein the read element 22 is radially offset from the write element 24. A memory 26 stores a self-servo writing program which is executed by a control system 28. During a first time interval, the read element 22 is positioned over a region of the first radial location. The read element 22 then reads at least part of the first A clock data 34A to generate first circumferential timing information and at least part of the first A servo bursts 36A to generate first position control information. The first position control information is used for positioning the write element 24 over the second radial location 32. The first circumferential timing information is used for writing at least part of the second B clock data 38B and at least part of the second B servo bursts 40B to the second radial location 32. During a second time interval, the read element 22 is positioned over the region of the first radial location. The read element 22 then reads at least part of the first B clock data 38A to generate second circumferential timing information and at least part of the first B servo bursts 40A to generate second position control information. The second position control information is used for positioning the write element 24 over the second radial location 32. The second circumferential timing information is used for writing at least part of the second A clock data 34B and at least part of the second A servo bursts 36B to the second radial location 32.

The head 20 is attached to the distal end of an arm 42 which is rotated about a pivot 44 by a voice coil motor (VCM not shown) in order to position the head 20 radially over the disk 18. In one embodiment, the head 20 comprises a magnetoresistive (MR) read element 22 and an inductive write element 24. During write operations, the digital data to be recorded to the disk 18 is transferred from the control system 28 to a preamplifier circuit 46 over line 48. The preamplifier circuit 46 generates a write signal 50 applied to the write element 24, wherein the write signal is modulated by the digital data. In NRZI recording, for example, each "0" bit modulates no change in the write signal 50 and a "1" bit toggles the state of the write signal (e.g., toggling the polarity of a write current) in order to write a magnetic transition onto the surface of the disk 18. During a read operation, the read element 22 senses the magnetic transitions recorded on the disk 18 and generates a read signal 52. The preamplifier circuit 46 amplifies the read signal 52 received from the read element 22 to generate an amplified read signal 54 output to the control system 28. The preamplifier circuit 46 is configured by control data supplied by the control system 28 over line 56 as is described in greater detail below with reference to FIGS. 8A and 8B.

The control system 28 processes the amplified read signal 54 from the preamplifier circuit 46 to generate the head position control information used to maintain proper tracking of the write element 24 while writing the servo sectors to the disk 18. For example, during the first time interval of FIG. 3 the control system 28 generates head position control information based on reading at least part of the first A servo bursts 36A from the previously servo-written track 30. The head position control information is applied to the VCM over line 58 to control the radial position of the head 20 so as to maintain proper tracking while writing the servo sectors to the current track 32.

Figure 4:
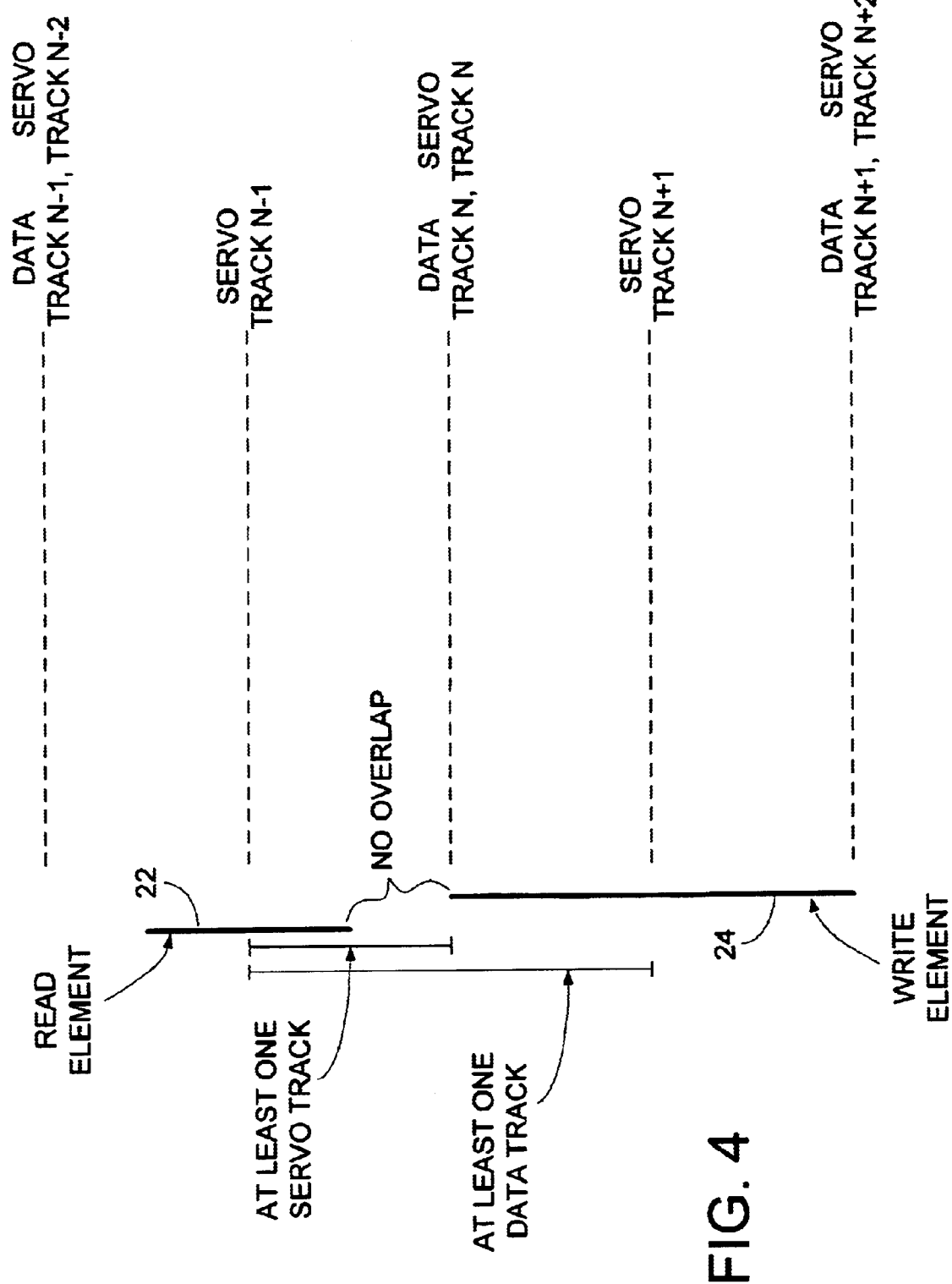
FIG. 4 shows details of a head comprising non-overlapping read and write elements offset by at least one data track.

FIG. 4 shows that in one embodiment the track pitch of the servo tracks is twice that of the data tracks; however, other suitable track pitch ratios may be employed. In the embodiments illustrated FIG. 3 through FIG. 6B, the servo writing is carried out by propagating the clock data and servo bursts from an outer diameter track to an inner diameter track. In an alternative embodiment, the clock data arid servo bursts are propagated from an inner diameter track to an outer diameter track. In either embodiment, the read element 22 always trails the write element 24 as the head 20 travels in the direction that the clock data and servo bursts are propagated.

To facilitate reading servo bursts of a previously servo-written track, the center of the read element 22 is radially offset from the center of the write element 24 by at least one data track as illustrated in FIG. 4. This allows the read element 22 to read the servo bursts from a previously servo-written track while the write element 24 is writing the servo sectors for a current track. Also as shown in FIG. 4, the center of the read element 22 is displaced from the center of the write element 24 to form a clearance between the inner edge of the read element 22 and the outer edge of the write element 24 such that the read element 22 does not overlap with the write element 24. This allows the write element 24 to erase the current track between the dipulses of the interleaved clock data without erasing the servo data or the servo bursts of the previously servo-written track. In addition, the read element 22 is manufactured with sufficient width and so that the center of the read element 22 is radially displaced from the outer edge of the write element 24 by at least one servo track. This ensures that the read element 22 reads a sufficient amount of servo burst information recorded in the previously servo-written track which insures proper tracking. The write element 24 is manufactured with sufficient width to facilitate a substantially seamless connection between the servo data and servo bursts of adjacent tracks.

Figure 5:
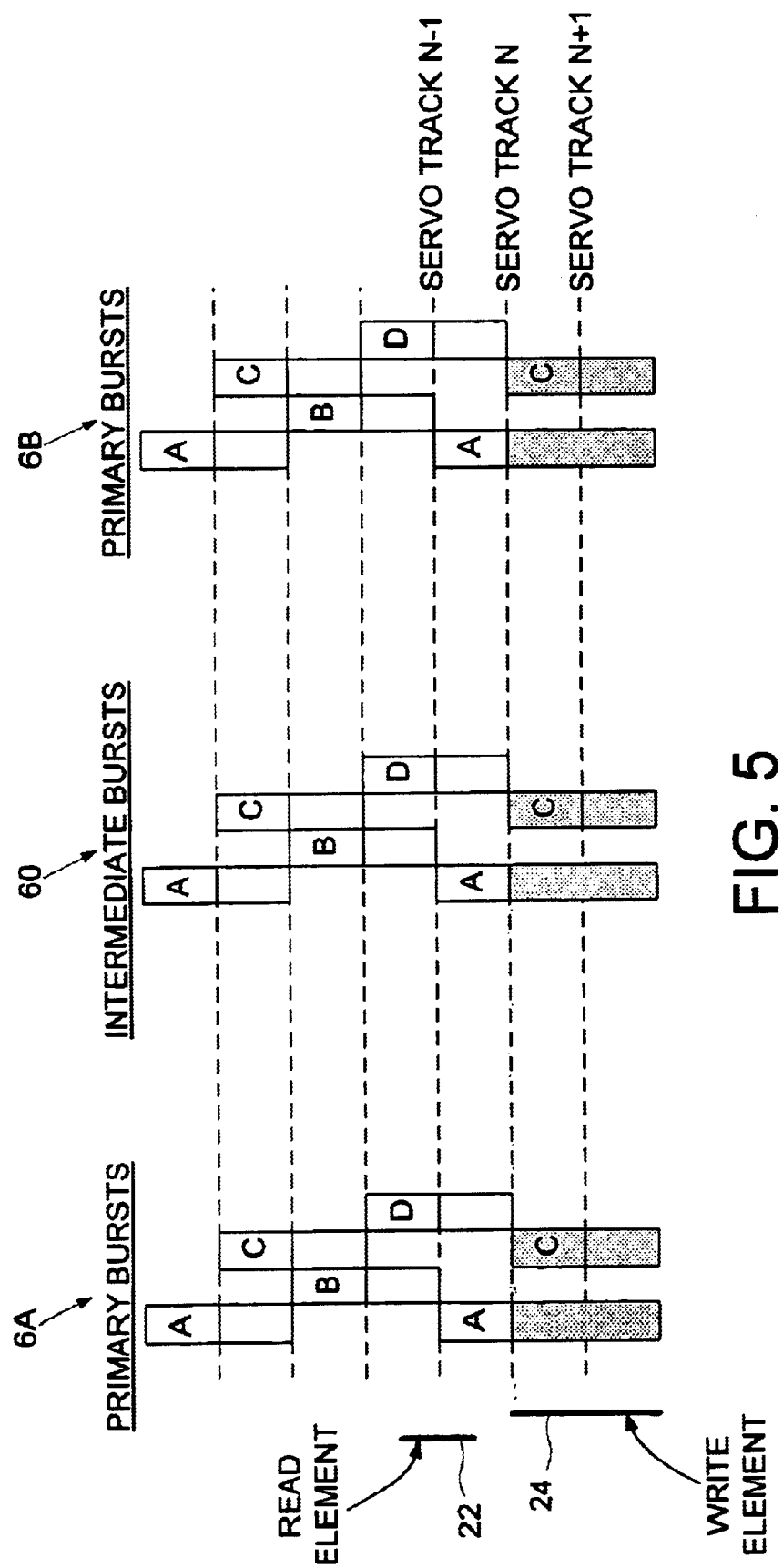
FIG. 5 illustrates certain aspects of the self-servo writing technique according to one embodiment of the present invention, including a head comprising a read and write element which are offset radially, and intermediate servo bursts which are overwritten after executing the self-servo writing procedure.

Techniques for generating head position control information from servo bursts are well known, and any suitable servo burst pattern may be employed in the embodiments disclosed herein. For example, it is known to generate head position control information from reading a conventional half-track A, B, C and D servo burst pattern as shown in FIG. 5. The signal-to-noise ratio (SNR) when tracking servo bursts is higher than the prior art method of tracking the amplitude of the read signal when reading clock data. Consequently, the present invention provides a more accurate estimate of head position control information and therefore enhances the self-servo writing process.

In another embodiment of the present invention, during the self-servo writing operation intermediate servo bursts are written between the primary servo bursts of the servo sectors 6 shown in FIG. 1. This is illustrated in FIG. 5 which shows an intermediate servo burst 60 written half-way between the primary servo bursts of servo sectors 6A and 6B. The intermediate servo bursts enhance the accuracy of the self-servo writing operation by providing additional head position control information while writing the servo sectors to a current track. Once the self-servo writing operation has finished, the intermediate servo bursts are overwritten, for example, by erasing the intermediate servo bursts or overwriting the intermediate servo bursts with user data.

Figure 6A:
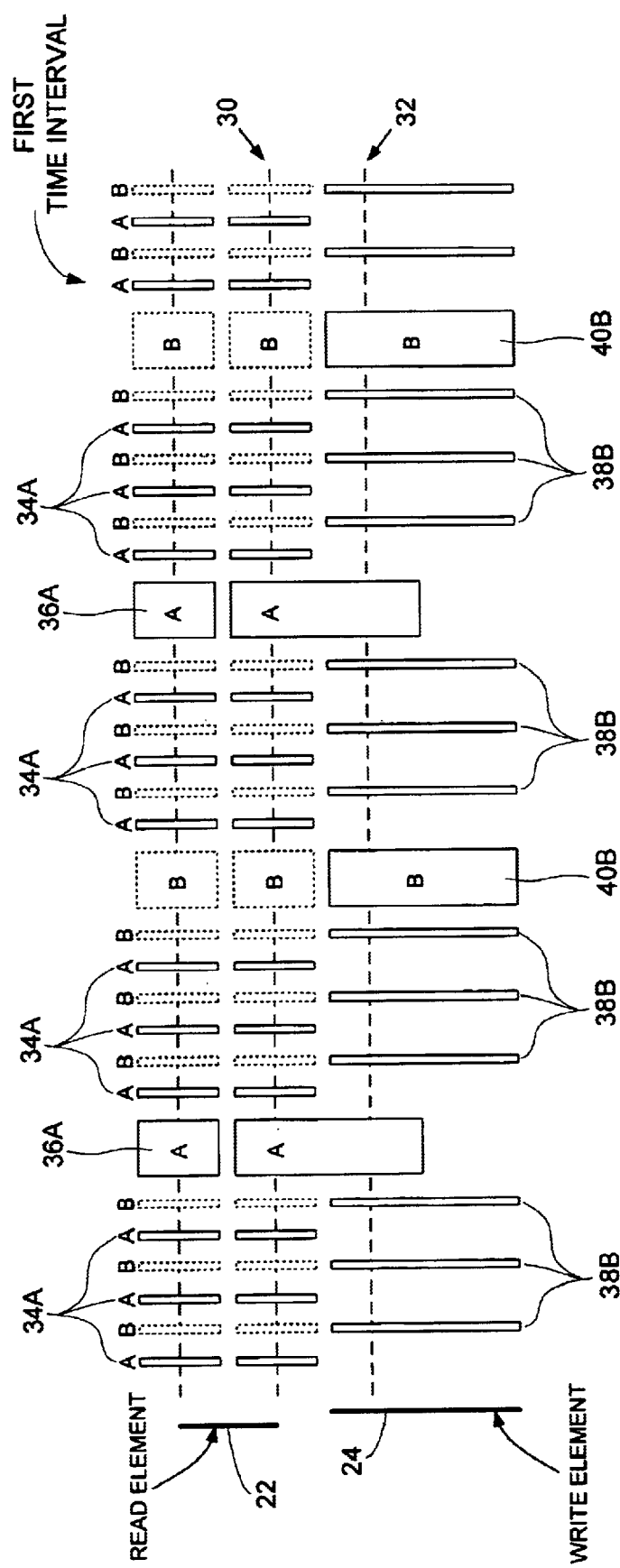
FIG. 6A and FIG. 6B illustrates a self-servo writing technique according to one embodiment of the present invention, wherein during a first time interval the read element reads first A clock data and first A servo bursts from a previously servo-written track and the write element writes second B clock data and second B servo data to the current track, and during a second time interval, the read element reads first B clock data and first B servo bursts from the previously servo-written track and the write element writes second A clock data and second A servo data to the current track.
Figure 6B:
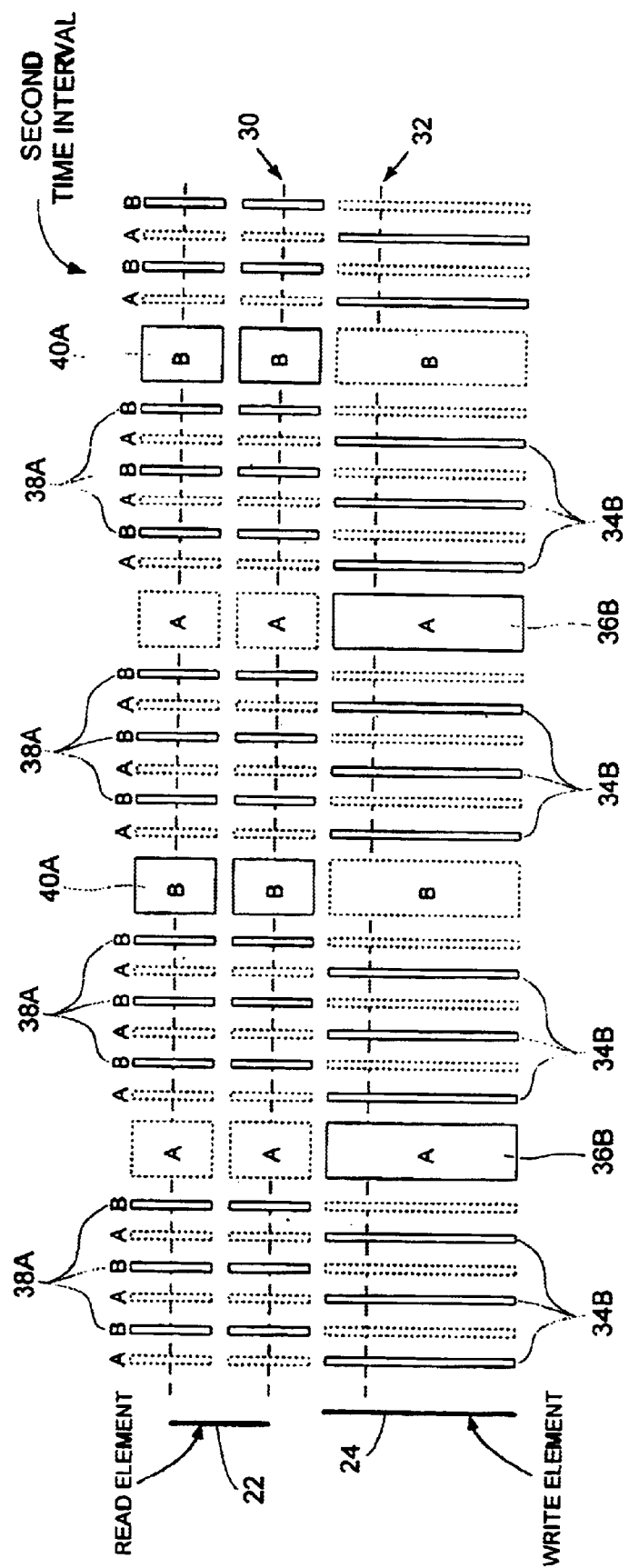

The self-servo writing operation of the disk drive 16 shown in FIG. 3 is better understood with reference to FIG. 6A and FIG. 6B. FIG. 6A illustrates the first time interval of the self-servo writing process wherein the read element 22 is positioned over a region of a previously servo-written track 30 and the write element 24 is positioned over a current track 32 where clock data and servo sectors are to be written. The read element 22 reads at least part of the first A clock data 34A from the previously servo-written track 30 and, after a selected delay based on the clock period, the write element 24 writes at least part of the second B clock data 38B to the current track 32. Similarly, the read element reads at least part of the first A servo bursts 36A from the previously servo-written track 30 and, when the head 20 reaches the next servo burst location on the disk 18, the write element 24 writes at least part of the second B servo bursts 40B to the current track 32. Thus, during the first time interval (e.g., during a first revolution of the disk 18) at least part of the second B clock data 38B and at least part of the second B servo bursts 40B are written to the current track 32.

FIG. 6B illustrates the self-servo writing operation during the second time interval wherein the roles are reversed. The read element 22 reads at least part of the first B clock data 38A from the previously servo-written track 30 and, after a selected delay based on the clock period, the write element 24 writes at least part of the second A clock data 34B to the current track 32. Similarly, the read element reads at least part of the first B servo bursts 40A from the previously servo-written track 30 and, when the head 20 reaches the next servo burst location on the disk 18, the write element 24 writes at least part of the second A servo bursts 36B to the current track 32. Thus, during the second time interval (e.g., during a second revolution of the disk 18) at least part of the second A clock data 34B and at least part of the second A servo bursts 36B are written to the current track 32. This technique of propagating interleaved sets of clock data and servo bursts continues until the entire disk 18 has been servo written.

The read element 22 is shown in FIG. 6A and FIG. 6B as positioned half-way between two previously servo-written tracks. However, the position of the read element 22 depends on the radial offset between the read element 22 and the write element 24. In general, the read element 22 may be positioned fractionally closer to or further away from the previously servo-written track 30 so as to correctly position the write element 24 over the current track 32. Further, there may be more than one previously servo-written track between the read element 22 and the write element 24 depending on the radial offset of the read and write elements as well as the radial location of the head 20 with respect to the disk 18. In other words, the previously servo-written track from which servo bursts are read may not be immediately adjacent to the current servo track being servo-written.

In one embodiment, only part of the A, B, C and D servo burst pattern is written to the current servo track during each pass. For example, FIG. 5 illustrates a servo writing pass wherein the inner part of the A servo burst is written (and extended into the next servo track), the C servo burst is written, and the D servo burst is trimmed. When servo writing the next servo track, the A servo burst is trimmed, the B servo burst is written, and the inner part of the C servo burst is written (and extended into the next servo track). This servo writing technique ensures a substantially seamless connection between the servo bursts of adjacent servo tracks.

FIG. 7 illustrates an embodiment of the present invention for writing the interleaved clock data to a current track. During the first time interval, the second B clock data 38B is written to the disk by writing dibits at a predetermined interval and erasing the track between the dibits. This is accomplished by setting the write current to a selected polarity (e.g., negative) and then toggling the write current (e.g., −+−) to write the dibit at the predetermined interval. During the second time interval, the second A clock data 34B is written to the disk by writing dibits at a predetermined interval. However, the area between the dibits is not erased so that the just written second B clock data 38B is not erased. This is accomplished by turning the write current off between dibits, turning the write current on with the correct polarity just prior to writing the dibit, writing the dibit (e.g., −+−), and then turning the write current off again until the next dibit location is reached. The write current is turned on in the same direction from track to track in order to always erase the surface of the disk in the same direction. The resulting dipulse responses as well as the composite dipulse response of the interleaved clock data is illustrated in FIG. 7.

Notice that during the first time interval of FIG. 7, a simultaneous read and write operation is occurring. The write element 24 is writing to the current 32 track by erasing the area between the dibits of the second B clock data 38B while the read element 22 is reading the first A clock data 34A of the previously servo-written track 30. Although writing transitions would interfere with the read element 22, writing a DC erase signal does not. And because the clock data is interleaved, the read signal is ignored when writing the dibit transitions to the current track 32. Thus, the preamplifier circuit 46 of FIG. 3 is suitably designed to allow a simultaneous read and write operation.

FIG. 8A and FIG. 8B show details of a suitable preamplifier circuit 46 for allowing a simultaneous read and write operation, that is, reading the interleaved clock data or servo burst information of a previously servo-written track while simultaneously writing a DC signal to the current track. The preamplifier circuit 46 shown in FIG. 8A interfaces to multiple heads (e.g., a top head HEAD #1 and bottom head HEAD #2); however, in an alternative embodiment the preamplifier circuit 46 may interface to a single head. The preamplifier circuit 46 receives via data input 47 write data 48 from the control system 28 which is to be recorded to a particular disk surface (top or bottom) by selecting the appropriate head. Suitable head control circuitry 62 is provided for selecting the appropriate head by configuring a multiplexer 64 via control line 65 to apply the write data 48 to a first amplifier circuit (66A or 66B). The head control circuitry 62 enables the first amplifier circuit (66A or 66B) via control line 67 to output a write signal (50A or 50B) via write signal output (53A or 53B) to the selected head (HEAD #1 or HEAD #2). During a read operation, a selected head (HEAD #1 or HEAD #2) generates a read signal (52A or 52B) input into the preamplifier circuit 46 via read signal input (51A or 51B) which is amplified by a second amplifier circuit (68A or 68B) to generate an amplified read signal (70A or 70B). The head control circuitry 62 enables the appropriate second amplifier circuit (68A or 68B) via control line 67 and configures the multiplexer 64 via control line 65 to select the appropriate amplified read signal (70A or 70B) as the amplified read signal 54 output to the control system 28 via write signal output 49.

The control system 28 configures the preamplifier circuit 46 with the appropriate head select information by providing control data over line 56 to control input 55 which is used to program the head control circuitry 62. FIG. 8B shows a suitable format for the control data 56 wherein three bits are used to identify the desired operation (read or write) as well as the desired head (HEAD #1 or HEAD #2). During a normal write operation the head select circuitry 62 is programmed to enable the appropriate first amplifier circuit (66A or 66B), and during a normal read operation the head select circuitry 62 is programmed to enable the appropriate second amplifier circuit (68A or 68B). During the self-servo writing operation, the head select circuitry 62 is programmed to allow a simultaneous read and write operation by enabling the appropriate first amplifier circuit (66A or 66B) as well as the appropriate second amplifier circuit (68A or 68B). These different modes of operation are illustrated in the table of FIG. 8B wherein an "X" in each row identifies the read and/or write operational mode of each head (HEAD #1 and HEAD #2) as configured by the control data received over line 56.

In one embodiment of the present invention, a seed track comprising interleaved A and B clock data and interleaved A and B servo bursts is first written to the disk 18 at some predetermined location (e.g., the outer diameter of the disk 18). For example, an external servo writer may be used to write the seed track in order to achieve very precise timing and alignment for the initial clocking data and servo sectors. The seed track provides an accurate reference for both radial and circumferential distance measurement. The external servo writer's throughput is faster since instead of servo writing the entire surface of the disk, only a seed track is servo written. Thereafter, the HDA is removed from the external servo writer, sealed, and the remaining tracks are self-servo written by the disk drive using the seed track.

Figure 9:
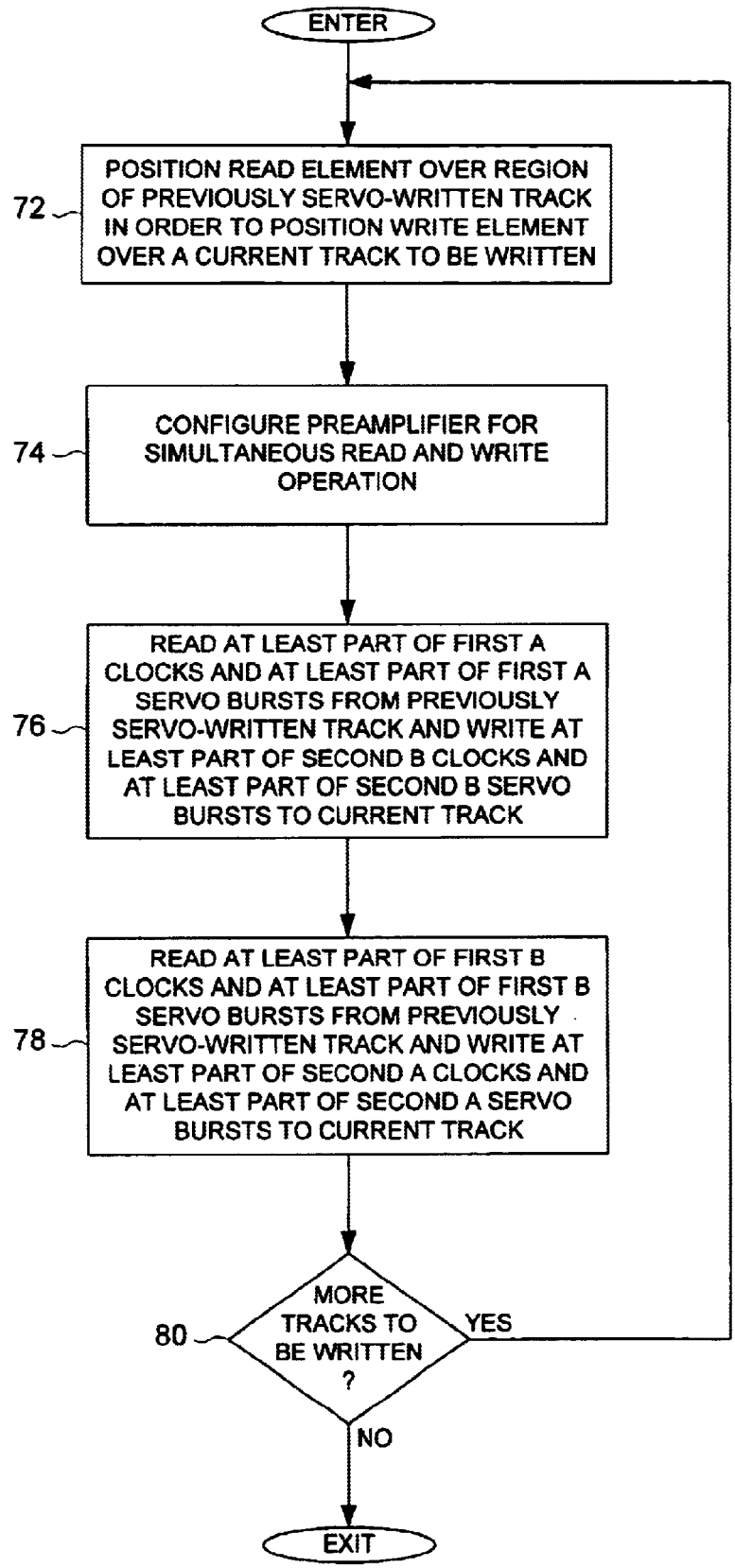
FIG. 9 is a flow diagram illustrating the steps of a self-servo writing program executed by the control system of FIG. 3 to facilitate an embodiment of the present invention.

FIG. 9 is a flow diagram illustrating the steps of the self-servo writing program stored in the memory 26 and executed by the control system 28 of FIG. 3. Those skilled in the art understand that the self-servo writing program could be implemented as code steps executed by a microprocessor within the control system 28, or alternatively implemented as steps of a state machine. At step 72 the control system 28 positions the read element 22 over a region of a previously servo-written track in order to position the write element 24 over a current track to be servo-written. At step 74 the control system 28 configures the preamplifier circuit 46 for a simultaneous read and write operation. Step 76 embodies the first time interval wherein the read element 22 reads at least part of the first A clock data 34A and at least part of the first A servo bursts 36A from a previously servo-written track 30 and the write element 24 writes at least part of the second B clock data 38B and at least part of the second B servo bursts 40B to the current track 32. Step 78 embodies the second time interval wherein the read element 22 reads at least part of the first B clock data 38A and at least part of the first B servo bursts 40A from a previously servo-written track 30 and the write element 24 writes at least part of the second A clock data 34B and at least part of the second A servo bursts 36B to the current track 32. In one embodiment, step 76 (the first time interval) is executed during a first revolution of the disk 18 and step 78 (the second time interval) is executed during a second revolution of the disk 18. Steps 76 and 78 are executed in an interleaved, propagating manner until all of the tracks have been servo written at step 80.

We claim:

1. A disk drive comprising:

(a) a disk comprising a first radial location for storing first clock data including a plurality of magnetic transitions recorded at a predetermined interval and a second radial location for storing second clock data including a plurality of magnetic transitions recorded at a predetermined interval;

(b) a head actuated radially over the disk, the head comprising a read element and a write element;

(c) a preamp comprising:
a data input for receiving write data from the control system;
a read signal output for outputting an amplified read signal to the control system;
a read signal input for receiving a read signal from the read element;
a write signal output for supplying a write signal to the write element;
a first amplifier circuit, responsive to the write data, for generating the write signal supplied to the write element via the write signal output;
a second amplifier circuit for amplifying the read signal from the read element to generate the amplified read signal output to the control system via the read signal output; and
a head control circuit, responsive to head select data received from the control system, for simultaneously enabling the first and second amplifier circuits to perform a simultaneous read and write operation; and (d) a control system for self-servo writing the disk by configuring the preamp circuit to enable the read element to read the first clock data from the first radial location and the write element to write the second clock data to the second radial location, wherein while the read element reads the magnetic transitions of the first clock data the write element simultaneously writes a DC erase signal between the magnetic transitions of the second clock data.

2. A method of self-servo writing a disk in a disk drive, the disk drive comprising the disk and a head actuated radially over the disk, the method comprising the steps of:

(a) reading first clock data from a first radial location of the disk in order to write second clock data to a second radial location of the disk, the first clock data comprising a plurality of magnetic transitions recorded at a predetermined interval and the second clock data comprising a plurality of magnetic transitions recorded at a predetermined interval; and (b) while reading the magnetic transitions of the first clock data, simultaneously writing a DC erase signal between the magnetic transitions of the second clock data.

* * * * *